United States Patent Office 3,250,796
Patented May 10, 1966

3,250,796
4-ISOCYANATOPHENYL NAPHTHYLMETHANES
Herbert Felix McShane, Jr., Wilmington, Del., assignor to E. I. du Pont de Nemours and Company, Wilmington, Del., a corporation of Delaware
No Drawing. Filed Dec. 21, 1962, Ser. No. 246,347
4 Claims. (Cl. 260—453)

This invention relates to a new and useful class of monomeric mono-, di- and polyisocyanates.

Aromatic mono-, di- and polyisocyanates are highly reactive chemical intermediates which find use in the preparation of a variety of chemical compounds useful as herbicides, dyes, pharmaceuticals, etc., and in the production of polymeric materials such as plastics, elastomers, and flexible and rigid foams.

It is an object of this invention to provide a new class of useful aromatic isocyanate compositions. Other objects will appear hereinafter.

These and other objects are accomplished by the new compositions which can be categorized as unsubstituted and substituted phenyl naphthylmethane isocyanates or, more particularly, as 4-isocyanatophenyl naphthylmethane and derivatives thereof. In other words, the new compositions include isocyanates in which a 4-isocyanatophenyl group is connected through a methylene radical to a naphthalene nucleus. The connection with the naphthlene nucleus can be at either the 1 or 2 position thereof. The new composition, 4-isocyanatophenyl naphthylmethane, and its derivatives can be represented by the following formula:

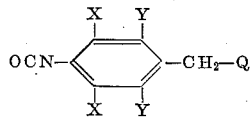

wherein Q is a radical selected from the group consisting of

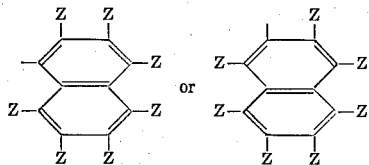

wherein X is independently selected from the group H, Cl, Br, and $C_1$–$C_4$ alkyl, and Y and Z are independently selected from the group X and —NCO, with the proviso that when a Z is —NCO, Z's in adjacent positions thereto must be X. The term "adjacent" is intended to include the peri position of a naphthalene nucleus.

While many of the compounds of the present invention can be made by a variety of routes, the process disclosed in my co-pending application, S.N. 246,325, filed of even date herewith, December 21, 1962, is preferred. To produce the novel isocyanate compositions of the present invention by this process, either a 4-isocyanatobenzyl halide is reacted with naphthalene or a naphthalene derivative or a halomethyl naphthalene derivative is reacted with phenyl isocyanate or a phenyl isocyanate derivative which bears a hydrogen atom para to the isocyanato group. The reaction is carried out in the presence of a Friedel-Crafts catalyst. The new isocyanate compositions thus produced are monomeric, polymerization, i.e., self-condensation of the α-halogen containing compound, being prevented by the high reactivity of the other reactant, viz. naphthalene or phenyl isocyanate or derivatives thereof. For example, α-chloro-4-tolyl isocyanate, α-chloro-2,4-tolylene diisocyanate, or 3,5-α-trichloro-2,4-tolylene diisocyanate may be reacted with naphthalene, 1-methylnaphthalene, 1-naphthyl isocyanate, 1-bromonaphthalene, 2-ethylnaphthalene, 1-sec-butylnaphthalene or 1,5-naphthylene diisocyanate to produce some of the isocyanates included in the present invention. Other isocyanates included can, for example, be prepared by reacting 1- or 2-(chloromethyl)naphthalene or 5-(chloromethyl)-1-naphthyl isocyanate with phenyl isocyanate, o-tolyl isocyanate, 2,4-tolylene diisocyanate, 2,6-tolylene diisocyanate, or 3-chloro-2,6-tolylene diisocyanate.

The starting materials for preparing the compounds of this invention are, in general, known compounds or are compounds which may be prepared in known ways. For example, naphthalene and its alkyl, bromo, and chloro derivatives are known. Siefken in Annalen 562, 75–136 (1948) discloses various isocyanato benzenes and naphthalenes, alkyl and chloro derivatives thereof, and methods for their preparation. Halogenation of aromatic isocyanates may be carried out according to the method described in U.S. Patents 2,915,545 and 2,945,875. (Halomethyl)aryl isocyanates may be prepared by the procedures given in German Patents 947,470 and 1,002,327. Ring-halogenated aromatic isocyanates which also bear a halomethyl group may be prepared by ring halogenation followed by halogenation of the methyl group. In some cases where neither reactant contains a chloromethyl group, a chloromethyl group may be introduced into one reactant by conventional techniques. See, for example, Organic Reactions, vol. 1, pages 63–90 (1942). Isocyanates may be prepared from known amino compounds in known ways.

As previously indicated, other preparative methods are available for producing the novel compounds of the present invention, although in general, these methods are more tedious. These include treatment of amine derivatives of phenyl naphthylmethane with phosgene and conversion of carboxyl groups in phenyl naphthylmethane to isocyanato groups via the Curtius reaction. The necessary amino or carboxyl containing phenyl naphthylmethanes may be made by combinations of conventional organic preparative methods such as nitration, reduction, amination with ammonia, oxidation and Friedel-Crafts condensation. These methods are well-known to those skilled in organic chemistry. The preparation of (4-isocyanatophenyl)naphthylmethane may be given as an example of the use of conventional reactions for the preparation of one of the novel isocyanates of the present invention. 4-nitrobenzyl chloride may be condensed with naphthalene in the presence of aluminum chloride to yield (4-nitrophenyl)naphthylmethane. Reduction of the nitrogroup by hydrogenation or iron gives the corresponding amine, which may be phosgenated in turn to yield the required isocyanate.

The phenyl naphthylmethane isocyanates of the present invention are colorless, viscous liquids or solids. They are capable of undergoing all the usual reactions exhibited by aromatic mono-, di- and polyisocyanates. Because of their extremely high boiling points, they exhibit low vapor pressures at normal temperatures and can be safely handled without special ventilation which is often required with more volatile isocyanates. In many cases mixtures of 1-naphthyl and 2-naphthyl isomers are obtained and for many applications these mixtures may be used and may even be preferred over individual compounds. Hence, the term "naphthyl" in 4-isocyanatophenyl naphthylmethane or substituted derivatives thereof is intended to indicate the presence of both isomers. Similarly, although Q in the foregoing described structural formula represents different naphthyl isomers, compounds containing Q in both isomeric forms rather than in the alternative are to be included within the scope of the present invention.

The monoisocyanates of this invention which are 4-isocyanatophenyl naphthylmethane or its derivatives, may be employed in any of the usual applications for aromatic monisocyanates, such as, treating wool and cellulose fibers to modify their properties, treating paper or latex impregnated paper to increase wet strength, capping oxymethylene polymers, removing active hydrogen impurities from petroleum products, and assisting in bonding a variety of plastic or elastic materials to fibers containing reactive hydrogen.

The diisocyanates of the present invention are useful for preparing polyurethane elastomers and plastics and polyurethane flexible and rigid foams. The diisocyanate prepared from 3,5,α-trichloro-2,4-tolylene diisocyanate and naphthalene, when reacted with an equivalent of a polyalkylene ether glycol, such as polypropylene ether glycol or polytetramethylene ether glycol of about 1,000 to 2,000 molecular weight, yields elastomers which are useful in vibration dampening applications. The diisocyanates of this invention are also particularly useful in the preparation of rigid urethane foams and, as previously mentioned, they are convenient to use without ventilation because of their exceptionally low vapor pressure. (2,4-diisocyanatophenyl)naphthylmethane which can be produced by reacting α-chloro-2,4-tolylene diisocyanate with naphthalene is useful in this application.

The phenyl naphthylmethane polyisocyanates of the present invention are useful in the preparation of a variety of adhesives and may also be used as cross-linking agents in preparing urethane elastomers and foams.

The following examples are representative of the new compositions falling within the scope of the present invention. Parts and percents are by weight unless otherwise indicated.

EXAMPLE 1

Into an agitated reaction vessel are charged 243 parts of 5,α-dichloro-2,4-tolylene diisocyanate, 500 parts of naphthalene and 7.5 parts of anhydrous ferric chloride. The reaction mass is heated to 50° C. at which point evolution of hydrogen chloride begins. The temperature of the reaction mass is further increased to 120° C. when evolution of hydrogen chloride becomes vigorous. Reaction is continued at 200° C. until the evolution of hydrogen chloride nearly ceases. This requires about 2 hours. The reaction mixture is then freed of unreacted naphthalene by distilling without fractionation at reduced pressure. The high boiling material containing the product is finally heated to 240° C. at 0.5 mm. Hg to remove low boilers, and the residue is transferred to a molecular still. About 150 parts of product is distilled off at temperatures ranging from 135–190° C. at 0.008–0.014 mm. Hg. The product is a very viscous amber liquid, and is identified as (5-chloro-2,4-diisocyanatophenyl)naphthylmethane, in which 1-naphthyl and the 2-naphthyl isomers are present.

*Analysis.*—Calculated for $C_{19}H_{11}N_2ClO_2$: C, 68.16; H, 3.31; N, 8.37; Cl, 10.59. Found: C, 68.05; H, 3.65; N, 8.15; Cl, 11.0.

EXAMPLE 2

In a vessel equipped with agitation are placed 896 parts of 3,5,6,α-tetrachloro-2,4-tolylene diisocyanate and 2085 parts of naphthalene. The materials are heated to about 90° C. so as to form a melt and the agitation is started. About 9 parts of anhydrous ferric chloride is added at 90° C. and the temperature is raised from 90–120° C. over about an hour. The temperature is then raised rapidly to about 160° C. where it is held for 4 hours and finally raised to 210° C. where the reaction is completed in about 2 hours as evidenced by the cessation of hydrogen chloride evolution. The reaction mass is cooled and distilled without fractionation at reduced pressure. Unreacted naphthalene is distilled at about 10 mg. Hg pressure and the pressure is then reduced to about 0.1 mm. Hg and an intermediate cut is taken prior to the product cut which boils at about 210–220° C. at 0.1 mm. Hg. The product cut is redistilled at 0.1 mm. to remove traces of low boilers. After redistillation it amounts to 700 parts and is a very viscous, nearly colorless liquid. The product is identified as (3,5,6-trichloro-2,4-diisocyanatophenyl)naphthylmethane in which 1-naphthyl and 2-naphthyl isomers are present.

*Analysis.*—Calculated for $C_{19}H_9N_2O_2Cl_3$: C, 56.53; H, 2.25; N, 6.94; Cl, 26.35; NCO, 20.82. Found: C, 56.6; H, 2.45; N, 6.91; Cl, 26.2; NCO, 19.65.

EXAMPLE 3

To a vessel equipped with an agitator and water cooled reflux condenser are added 320 parts of 1-naphthyl isocyanate and 320 parts of α-chloro-4-tolyl isocyanate. The mixture is heated to 50° C., agitation is started, and 5.5 parts of ferric chloride is added. Over a period of 2 hours the temperature is raised at an even rate to 210° C. The reaction mass is held at 210° C. for about 4 hours after which the evolution of hydrogen chloride essentially ceases. The reaction mass is cooled and distilled without fractionation at reduced pressure. After removing low boilers, the crude product distills at about 200° C. at 0.1 mm. Hg. The product cut is redistilled to remove traces of tar entrained in the first distillation. The product cut, after redistillation, amounts to about 308 parts of a colorless liquid which crystallizes on standing at room temperature. After recrystallizing twice from hexane, this material has a melting point of 86.0–86.5° C. The product is identified as (4-isocyanatophenyl)(4-isocyanato-1-naphthyl)methane.

*Analysis.*—Calculated for $C_{19}H_{12}N_2O_2$: C, 75.98; H, 4.03; N, 9.33; NCO, 27.98. Found: C, 75.95; H, 4.10; N, 9.18; NCO, 28.05.

When one of the following diisocyanates instead of α-chloro-4-tolyl isocyanate is reacted in similar fashion, the product obtained is shown as follows:

| Tolylene diisocyanate reacted | (Substituted Phenyl) (4-isocyanato-1-naphthyl)methane obtained |
|---|---|
| 5,α-dichloro-2,4-tolylene | 5-chloro-2,4-diisocyanatophenyl. |
| 3,5,6,α-tetrachloro-2,4-tolylene | 3,5,6-trichloro-2,4-diisocyanatophenyl. |
| 3,5,-α-trichloro-2,4-tolylene | 3,5-dichloro-2,4-diisocyanatophenyl. |
| 5,6,α-trichloro-2,4-tolylene | 5,6-dichloro-2,4-diisocyanatophenyl. |
| 3,5,α-trichloro-2,6-tolylene | 3,5-dichloro-2,6-diisocyanatophenyl. |

EXAMPLE 4

Into a reaction vessel, equipped with an agitator and water-cooled reflux condenser, are placed 640 parts of naphthalene and about 278 parts of a trichlorinated toluene diisocyanate, the latter prepared by (a) ring dichlorination of a mixture having a composition of 80 parts toluene-2,4-diisocyanate and 20 parts of toluene-2,6-diisocyanate in the presence of ferric chloride; (b) distillation of the dichlorination reaction mass at reduced pressure; (c) chlorination of the methyl group on the distilled ring dichlorinated toluene dissocyanate by the method of German Patent 1,002,327 and (d) distillation of the trichlorinated toluene diisocyanate. The mixture of naphthalene and trichlorinated toluene diisocyanate is heated to about 60° C., agitation is started, and about 9 parts of ferric chloride is added. The temperature is raised at an even rate to 200° C. over a period of 2 hours and maintained at 200° C. for an additional 4 hours, after which evolution of hydrogen chloride essentially ceases. The reaction mass is cooled and distilled without fractionation at reduced pressure. Unreacted naphthalene is removed first at about 10 mm. Hg pressure and the product is distilled from non-volatile material at about 205–210° C. at 0.1 mm. Hg. The product is redistilled at about 0.1 mm. Hg to remove traces of entrained high boilers from the first distillation. The redistilled product is a light amber, very viscous liquid at room temperature. The product is identified as a mixture of (dichloro-2,4-diisocyanatophenyl) and (dichloro - 2,6 - diisocyanatophenyl)naphthylmethanes, namely—(3,5-dichloro-2,4-diisocyanatophenyl)naphthylmethane, (5,6-dichloro-2,4-diisocyanatophenyl)naphthylmethane, and (3,5-dichloro-2,6-diisocyanatophenyl)naphthylmethane, in which 1-naphthyl and 2-naphthyl isomers are present in each naphthylmethane compound.

*Analysis.*—Calculated for $C_{19}H_{10}N_2O_2Cl_2$: C, 61.82; H, 2.73; N, 7.59; Cl, 19.21; NCO, 22.76. Found: C, 61.95; H, 2.6; N, 7.27; Cl, 18.85; NCO, 22.60.

As many apparently widely different embodiments of this invention may be made without departing from the spirit and scope thereof, it is to be understood that this invention is not limited to the specific embodiments thereof except as defined in the appended claims.

What is claimed is:
1. (5 - chloro - 2,4 - diisocyanatophenyl)naphthylmethane.
2. (3,5,6 - trichloro - 2,4 - diisocyanatophenyl) - naphthylmethane.
3. (Dichloro - 2,4 - diisocyanatophenyl) - naphthylmethane.
4. (Dichloro - 2,6 - diisocyanatophenyl) - naphthylmethane.

References Cited by the Examiner
FOREIGN PATENTS
779,806   8/1954   Great Britain.

OTHER REFERENCES
Bailey et al.: Ind. and Eng. Chemistry, vol. 48, pp. 794–797 (1956).

CHARLES B. PARKER, *Primary Examiner.*